United States Patent

[11] 3,604,679

| [72] | Inventor | John V. Pennington<br>Houston, Tex. |
|---|---|---|
| [21] | Appl. No. | 874,611 |
| [22] | Filed | Nov. 6, 1969 |
| [45] | Patented | Sept. 14, 1971 |
| [73] | Assignee | Cameron Iron Works, Inc.<br>Houston, Tex. |

[54] VALVE OPERATOR
13 Claims, 6 Drawing Figs.

[52] U.S. Cl. ................................................. 251/26,
251/31, 60/51
[51] Int. Cl. ......................................................... F16k 31/14
[50] Field of Search ........................................... 251/25, 26,
31; 60/51

[56] References Cited
UNITED STATES PATENTS

| 3,044,481 | 7/1962 | Regan | 251/26 X |
|---|---|---|---|
| 3,156,255 | 11/1964 | Gasquet et al. | 251/26 X |

*Primary Examiner*—Arnold Rosenthal
*Attorney*—Hyer, Eickenroht, Thompson & Turner

ABSTRACT: There is disclosed an operator for opening and closing a valve in response to pressure differentials. The energy for providing the pressure differentials is derived from pressure variations of fluid within a flowline, and such fluid is exhausted to the flowline during operation of the valve.

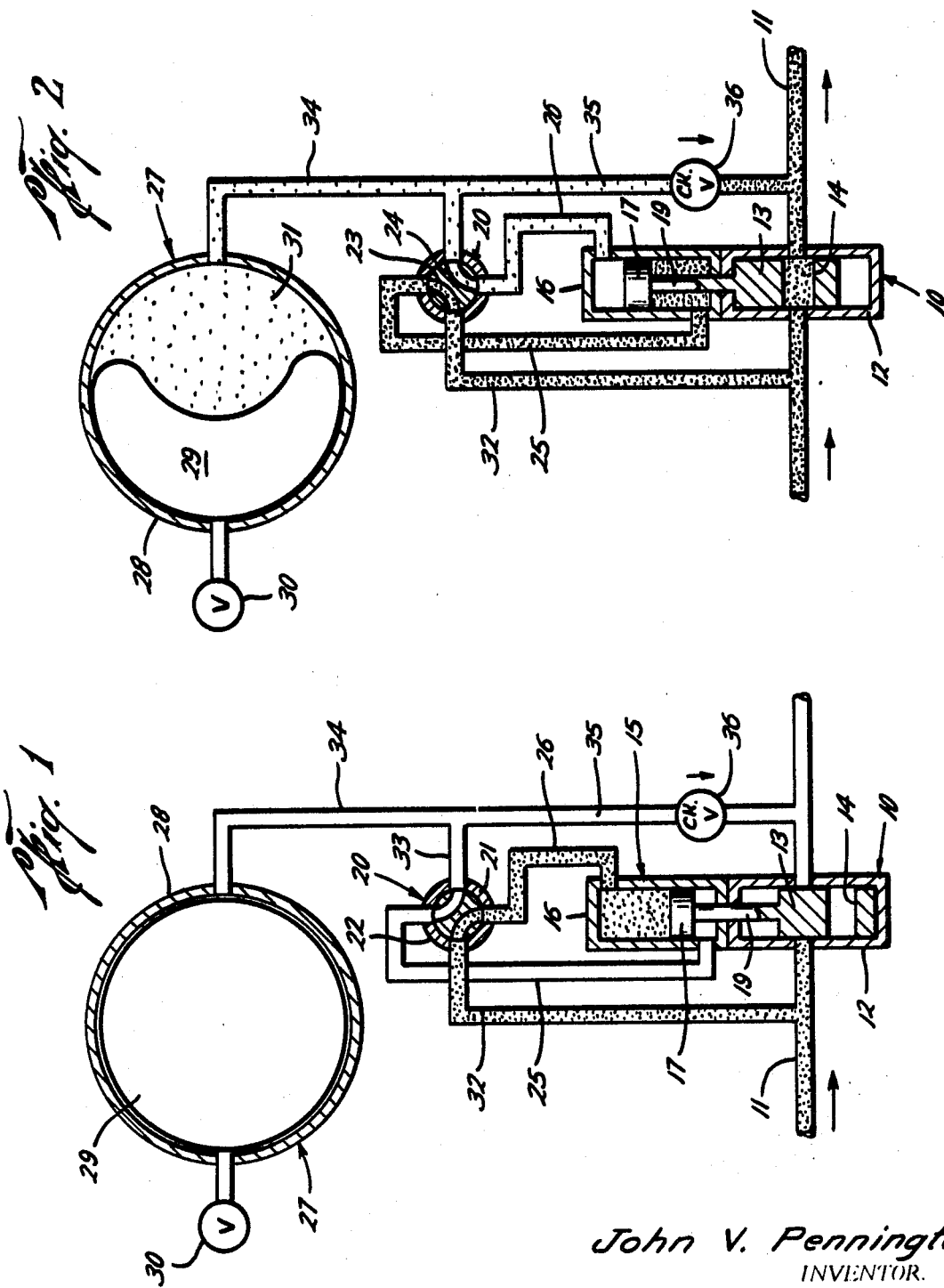

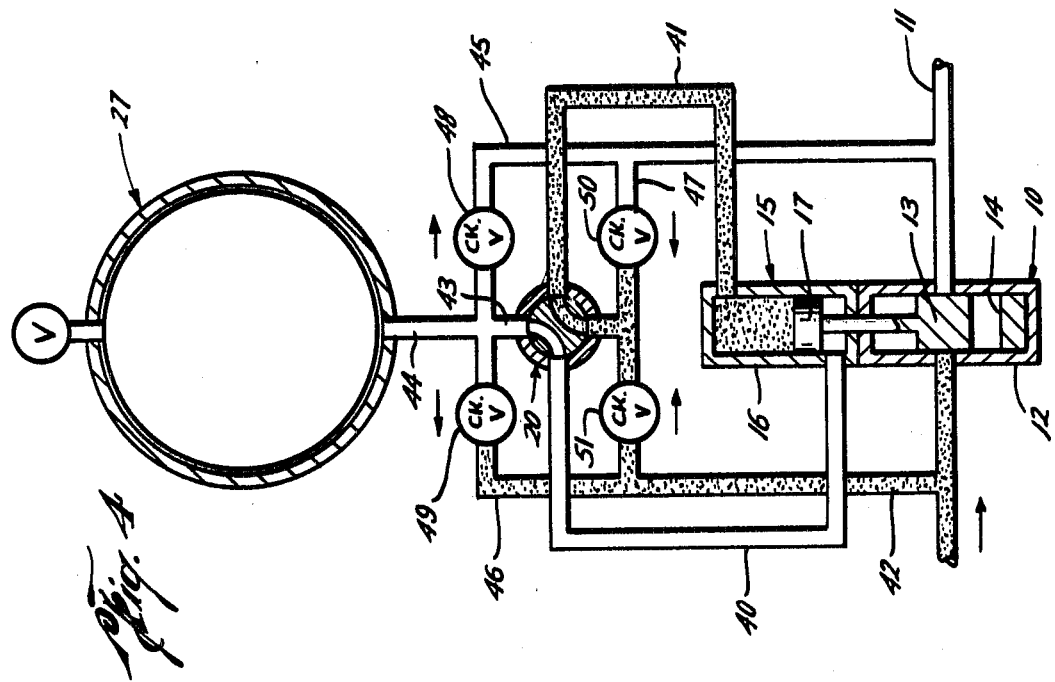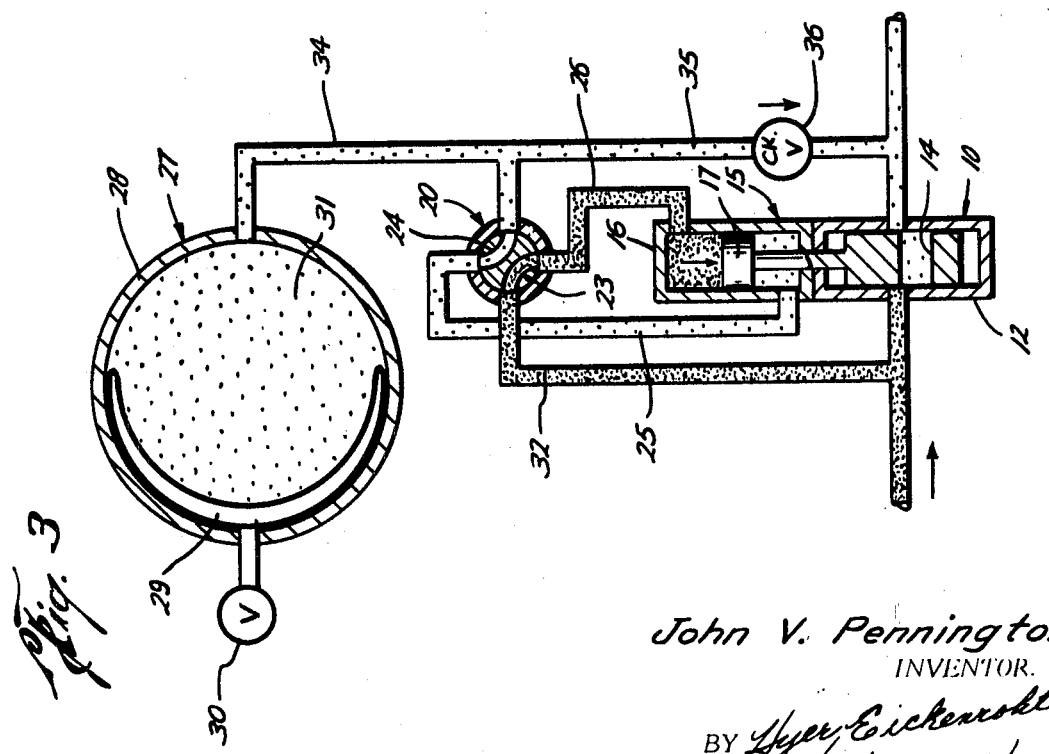

John V. Pennington
INVENTOR.

BY Hyer, Eickenroht
& Thompson
ATTORNEYS

VALVE OPERATOR

This invention relates generally to operators for valves. More particularly, it relates to improvements in valve operators which are actuated by means of energy derived from pressure variations in a flowline.

It has previously been proposed to operate valves by simultaneously introducing upstream line fluid to one side and exhausting it from the other side of a piston-type actuator connected to the closure member of the valve, so as to create a pressure differential thereacross. For example, conduits may connect a four-way valve with the opposite sides of the actuator, with the upstream side of the closure member, and with the exhaust, so that, upon selective shifting of the four-way valve, the predominant line fluid will cause the closure member to be moved to the desired position.

In such prior operators, as shown for example in Probert, U.S. Pat. No. 412,789, the operating fluid is exhausted to the atmosphere. This may be undesirable if the line fluid is explosive or pollutes the surrounding atmosphere. Furthermore, if the valve operator is underwater, the outside pressure may be so high as to prevent exhaust of the operating fluid.

Glasgow, U.S. Pat. No. 2,854,994 shows a valve having an operator of this general type in which the line fluid is not exhausted to the atmosphere, but instead is dumped back into the line on the downstream side of the closure member. However, this valve can only be used as a dump valve and will not function when disposed in a line in which pressure is equalized on both sides of the valve when open. Thus, in this latter environment, the operator of the Glasgow patent would cause the valve to close just as soon as it opened.

An object of this invention is to provide an operator in which operating flowline fluid may be exhausted back into the flowline, but which may nevertheless be used in operating valves other than dump valves.

Another object is to provide such an operator which provides maximum power when needed most, i.e., at the beginning of each operating stroke.

A further object is to provide such an operator which is neither expensive nor complicated to construct and use.

Still another object is to provide such an operator which, with only a minimum of additional parts, may be used when flow is in either direction through the line.

These and other objects are accomplished in accordance with the present invention, by an operator which includes a pair of conduits each connecting one pressure responsive surface of the actuator to the flowline, an accumulator connected to one of these conduits, and a one-way valve means in the one conduit intermediate the flowline and accumulator. With such an arrangement, fluid pressure in the accumulator tends to approach one extreme value of pressure variations which occur in the flowline and thereby provides a differential between the accumulator pressure and another value of the flowline pressure, which differential may be used in moving the closure member.

In the illustrated embodiments of this invention, the valve is disposed in the flowline, whereby pressure variations occur as a result of opening and closing the valve, and a four-way valve is connected between the pressure responsive surfaces of the actuator and the accumulator and the other conduit, respectively. In this way, accumulator pressure can be selectively directed to one such surface while flowline pressure at another value, either with the valve opened or closed, can be directed to the other surface for causing the valve to move in a desired direction.

In these illustrated embodiments, the conduit to which the accumulator is connected is in turn connected to the downstream side of the closure member, and the other conduit is connected to the upstream side thereof. Thus, the accumulator pressure acting on one surface of the actuator tends to approach the low level of flowline pressure on the downstream side of the closure member in its closed position, while the flowline pressure acting over the other pressure responsive surface is at a higher value.

In one embodiment of the invention, there are additional conduits and check valves which enable operation of the valve in response to fluid flow in either direction through the line, i.e., regardless of which side of the closure member is upstream, or downstream. In this latter embodiment, the accumulator, four-way valve, and actuator are not duplicated, and the additional conduits and check valves are so arranged as to permit the predominant pressure in the line to automatically select the proper path for operating the valve in the same manner as the embodiment of the invention adapted for operating in the case of flow in only one direction.

In the drawings, wherein like reference characters are used throughout to designate like parts:

FIG. 1 is a diagrammatic view of a valve having an operator constructed in accordance with the first embodiment of the present invention, and showing the closure member of the valve in a position to close the flowline in which the valve is disposed;

FIG. 2 is a view similar to FIG. 1, but showing the closure member in flowline opening position;

FIG. 3 is another view similar to FIGS. 1 and 2, but with the closure member moved back to a position approaching flowline closing position;

FIG. 4 is a diagrammatic view of a valve having an operator constructed in accordance with the second-described embodiment of the invention, and showing the closure member in flowline closing position with upstream pressure on the left;

Figure 6:
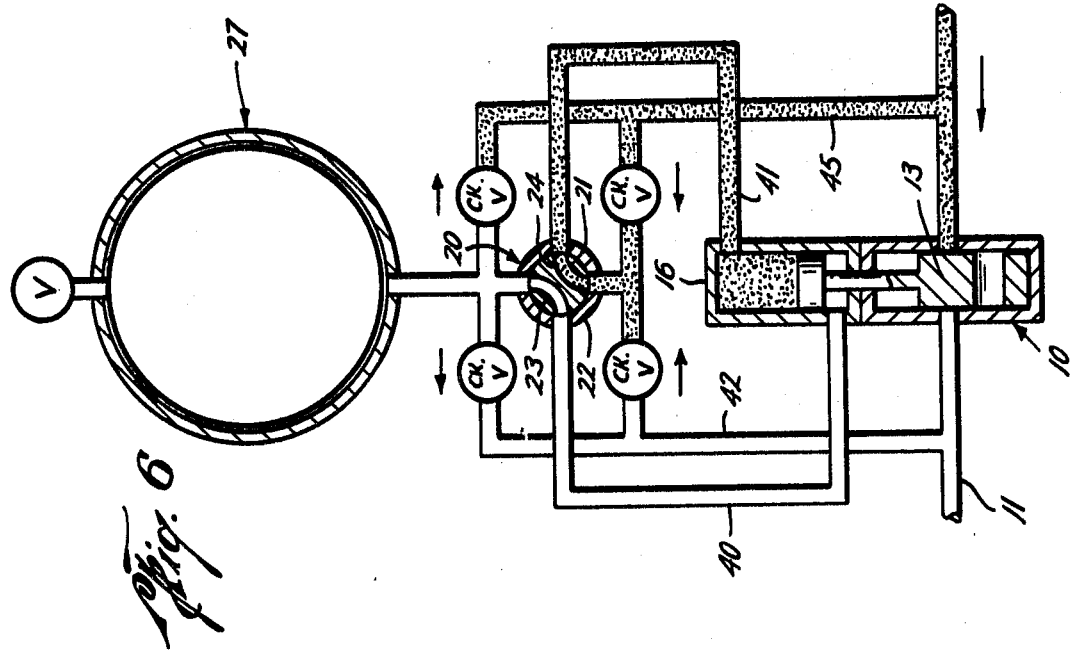
FIG. 6 is a view similar to FIG. 4, but with the upstream pressure on the right.

With reference now to the details of the drawings, and particularly the embodiment of the invention illustrated in FIGS. 1 to 3, the valve 10 disposed in flowline 11 for controlling flow therethrough includes a valve body 12 connected at its opposite sides to the flowline and a closure member 13 movable within the body between positions opening and closing the flowline. For purposes of illustration, the valve is of a gate type and the closure member has a through conduit 14 which is brought into alignment with the flowline 11 in its open position. However, it is contemplated that the invention may be used with other types of valves as well as with gate valves having other types of gates.

As indicated by the arrow in FIGS. 1, 2 and 3, flow through the flowline is in a direction from left to right, so that, with the valve closed, as shown in FIG. 1, the pressure of fluid within the flowline 11 on the upstream side of the closure member 13 is relatively high, as illustrated by the heavy stippling within the left side of the flowline. On the other hand, the pressure of fluid in the flowline on the downstream side of the closure member is relatively low, as indicated by the absence of stippling on the right side of the flowline. Upon opening of the closure member, as indicated in FIG. 2, the pressure of the fluid in the flowline 11 equalizes across the closure member and is thus high on both sides of the closure member, as indicated by the heavy stippling throughout the length of the line 11.

When the closure member is in partially closed position, as shown in FIG. 3, there will of course be a pressure drop across the closure member so that the pressure of fluid in the line on the downstream side thereof is higher than it would be in the event the valve was fully closed, but nevertheless lower than fluid pressure upstream from the closure member. This lower pressure is indicated by the light stippling on the right-hand portion of the line 11 in FIG. 3.

The operator illustrated in FIGS. 1 to 3 includes an actuator 15 comprising a cylinder 16 on one end of the valve body 12 and a piston 17 reciprocable within the cylinder and having a rod 19 which extends through the adjacent ends of the cylinder and valve body for connection with the closure member 13. The cylinder is ported adjacent its upper and lower ends, so that, as will later be described, the closure member may be reciprocated between opened and closed position in response to the selective introduction through the ports of upstream line fluid to and exhaust of line fluid from the upper and lower pressure responsive sides of the piston.

A rotary type, four-way valve 20 including a cylindrical casing 21 having a plug 22 rotatable therein is provided with passages 23 and 24 adapted to connect, in alternate positions, alternate pairs of ports in the casing 21 arranged at 90° intervals about its circumference. Conduit means connect ports in the valve 20 with the ports in the actuator cylinder 16, and thus with opposite sides of the reciprocable piston 17. Thus, a conduit 25 connects the uppermost port in valve casing 21 with the lower port in cylinder 16, and a conduit 26 connects the lowermost port in the casing 21 with the uppermost port in the cylinder 16.

The operator also includes an accumulator 27 which, in the illustrated embodiment, comprises a spherical storage container 28. Preferably, and as illustrated, there is a bladder 29 within the container 28 which may be inflated with gas through valve 30 to a pressure preferably only slightly greater than the maximum downstream pressure expected with valve 10 closed. This provides a chamber 31 between the container wall and bladder which is expandable and contractable in response to the pressure and volume of the fluid to be stored in it.

Additional conduit means connect other ports in the four-way valve 20 with each of the upstream side of the closure 13 and the accumulator 27. Thus, a conduit 32 connects line 11 on the upstream side of closure member 13 with the left-hand port in the four-way valve casing 21, a conduit 33 connects the right-hand port in the casing 21 with a conduit 34 leading to the storage chamber in accumulator 27, and a conduit 35 connects the accumulator at the intersection of the conduits 33 and 34 with line 11 on the downstream side of closure member 13. Therefore, conduits 33 and 35 constitute first conduit means for connecting either surface of the piston with the flowline, and conduit 32 constitutes second conduit means for connecting the other piston surface to the flowline. A check valve 36 in the conduit 35 permits flow therein only in the direction indicated by the arrow i.e., only when the pressure in the accumulator is higher than the pressure in line 11 downstream from the closure member.

With valve 10 closed and with four-way valve 20 set in the position shown in FIG. 1, upstream line pressure acts on top of piston 17, as indicated by the heavy stippling, and accumulator 27 is fully exhausted through check valve 36 to the downstream portion of line 11. Thus, the pressure below the piston and in the accumulator is no greater than the pressure on the downstream side of the valve, and maximum force is available to start the upward stroke of the piston when the valve is to be opened.

To open valve 10, the four-way valve 20 is moved to the position shown in FIG. 2 to connect the upstream portion of line 11 with the bottom of piston 17 by way of conduits 32 and 25, and the top of the piston is connected with the accumulator 27 by way of conduits 26, 33 and 34 and with the downstream portion of line 11 by way of conduits 26, 33 and 35. Thus, as piston 17 rises to open valve 10, fluid from above the piston 17 is exhausted to the accumulator and through the check valve 36 to the downstream portion of line 11. After some motion of the piston, downstream pressure will rise until it equals the exhaust pressure. At this time, check valve 36 closes and further exhaust is entirely to the accumulator. Thus, when valve 10 is fully open, as shown in FIG. 2, the pressure in the accumulator has been increased to some intermediate pressure, as indicated by the light stippling. The accumulator is thus partially filled with exhaust fluid.

To close valve 10, four-way valve 20 is returned to the position of FIG. 1 so as to connect upstream pressure with the top of the piston 17 and exhaust it from below the piston to the accumulator 27. As closure member 13 approaches closed position, a point is reached at which downstream pressure has dropped to equal accumulator pressure. Just before such point is reached, the accumulator storage chamber is fully loaded and at its highest pressure, although still less than upstream line pressure, as shown in FIG. 3. Just after such point is reached in the downward movement of closure member 13, check valve 36 opens to permit the accumulator to dump into the downstream side of line 11, and further exhaust from the accumulator will then be to the downstream side.

It is to be understood that the relative volumes of bladder 29 as shown in FIGS. 1, 2 and 3 are schematic and that actual volumes may be determined by means well known in the accumulator art.

Figure 5:
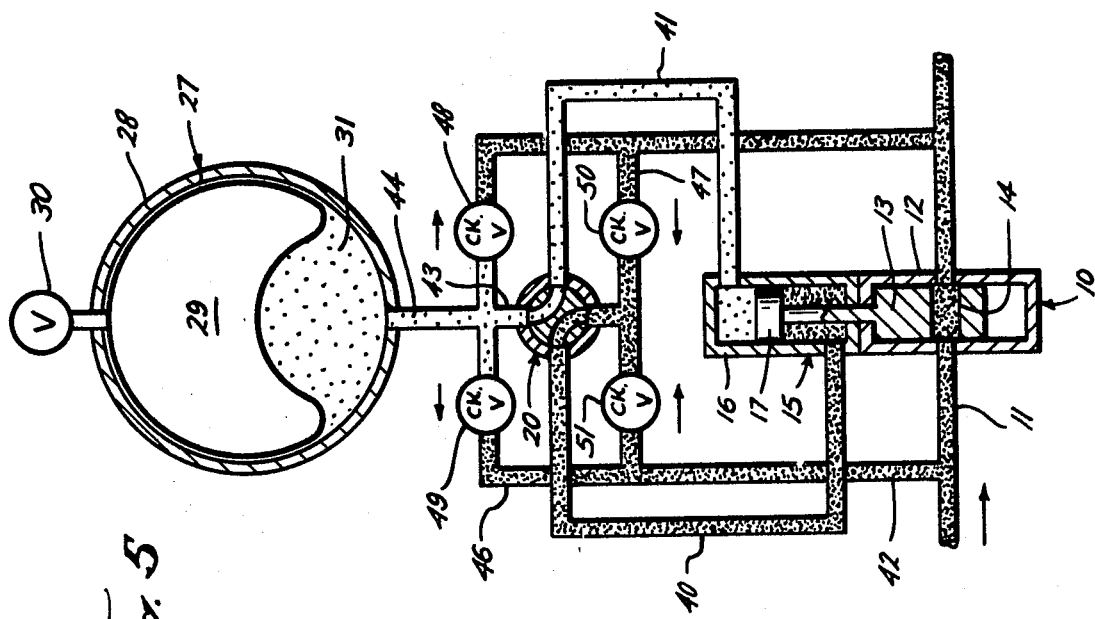
FIG. 5 is a view similar to FIG. 4, but with the closure member in flowline opening position.

In the alternate embodiment of the invention illustrated in FIGS. 4 to 6, valve 10 is disposed in line 11 and many parts of the operator are identical with those of the embodiment illustrated in FIGS. 1 to 3. These include the actuator 15, the auxiliary valve 20, and the accumulator 27. As distinguished from the embodiment of FIGS. 1 to 3, the operator of FIGS. 4 to 6 enables valve 10 to be opened and closed regardless of whether upstream pressure in line 11 is to the left or right of valve 10. This is accomplished by the mere addition of three check valves and their connections.

When upstream pressure is to the left of valve 10, as indicated in FIGS. 4 and 5, valve 10 is operated in essentially the same manner as described in connection with FIGS. 1 to 3, and certain portions of the line and the operator have been stippled to illustrate this. Thus, there is a conduit 40 connecting the actuator on the lower port of cylinder 16 with the four-way valve 20, and a conduit 41 connecting the port in the upper end of the cylinder with valve 20. A conduit 42 connects the line 11 on the upstream side of the closure member 13 with a four-way valve 20, while a conduit 43 connects the upper port in the four-way valve with a conduit 44 leading to the accumulator 27. A conduit 45 connects the accumulator with the line 11 on the downstream side of the closure member, and a check valve 48 is disposed in the conduit. As will be apparent from the description below, these conduits correspond in function to the previously described conduits 25, 26, 32, 33 and 35 of the first embodiment when upstream pressure is to the left of valve 10.

In addition to the foregoing, the operator illustrated in FIGS. 4 to 6 includes a conduit 46 connecting conduit 42 with conduit 44 leading to the accumulator 27, and a conduit 47 connecting conduit 42 with conduit 45 intermediate check valve 48 and the connection of conduit 45 with line 11. More particularly, there is a check valve 49 in the conduit 46 which prevents flow from the conduit 42 to the accumulator, as indicated by the arrow. As also indicated by arrows, check valves 50 and 51 prevent flow between the upstream and downstream sides of the closure member through conduits 42 and 45.

With upstream pressure on the left of valve 10, and the auxiliary valve in the position of FIG. 4, check valves 49 and 50 are closed and conditions are as described in connection with FIG. 1. Assuming, however, that upstream pressure is on the right, as indicated in FIG. 6, check valves 48 and 51 are closed. As a result, line pressure is applied through conduits 45 and 41 to the top port of cylinder 16, and fluid from the lower port of the cylinder exhausts through conduits 40, 43 and 44 into the accumulator 27. In this manner, the actuator is caused to move downwardly to move the closure to line closing position.

However, when the four-way valve is manipulated to the position of FIG. 5, line fluid from the right side of line 11 will pass through the conduits 45, 47 and 40 to the lower side of the piston 17, and fluid in the upper side of the piston is exhausted through conduits 41, 43 and 44 into the accumulator 27. In this manner, of course, the closure member 13 is caused to move upwardly to its open position, as described in connection with FIG. 5. The amount of exhaust fluid in the accumulator follows the same cycle as described in connection with FIGS. 1 to 3.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Apparatus for operating a valve by means of energy derived from a flowline subject to fluid pressure variations, comprising an actuator having a pair of oppositely reacting fluid pressure responsive surfaces and means for moving the closure member of the valve between alternate positions in response to the reaction of said surfaces to pressure differential thereacross, first conduit means for connecting one surface to the flowline, second conduit means for connecting the other surface to the flowline, means in said first and second conduit means intermediate their connections to said actuator surfaces and said flowline for selectively reversing the direction in which the pressure differential is effective across said actuator surfaces, an accumulator, means connecting the accumulator to the first conduit means intermediate said reversing means and the connection of the first conduit means to said flowline, and one-way valve means in the first conduit means intermediate its connections to the flowline and to the accumulator, whereby fluid pressure in the accumulator tends to approach one extreme value of said pressure variations to provide a differential between the accumulator pressure and another value of the flowline pressure for use in moving the closure member.

2. Apparatus of the character defined in claim 1, wherein said reversing means comprises a four-way valve.

3. Apparatus of the character defined in claim 1, wherein said one-way valve means includes means to prevent flow from the flowline to the accumulator.

4. Apparatus of the character defined in claim 2, wherein said one-way valve means includes means to prevent flow from the flowline to the accumulator.

5. Apparatus comprising a valve connectable in a flowline and having a closure member movable between alternate positions for opening and closing the flowline, an actuator having a pair of oppositely reacting fluid pressure responsive surfaces and means for so moving the closure member in response to the reaction of said surfaces to pressure differential thereacross, first conduit means for connecting one surface to the flowline, second conduit means for connecting the other surface to the flowline, means in said first and second conduit means intermediate their connection to said actuator surfaces and said flowline for selectively reversing the direction in which the pressure differential is effective across said actuator surfaces, an accumulator connected to the first conduit means intermediate said reversing means and the connection of the first conduit means to said flowline, and one-way valve means in the first conduit means intermediate its connections to the flowline and to the accumulator, whereby fluid pressure in the accumulator tends to approach one extreme value of pressure variations in the flowline to provide a differential between the accumulator pressure and another value of the flowline pressure for use in moving the closure member.

6. Apparatus of the character defined in claim 5, wherein the first and second conduit means connect with the flowline on opposite sides of the closure member.

7. Apparatus of the character defined in claim 6, including means for providing said differential regardless of the direction in which fluid flows through the pipeline.

8. Apparatus of the character defined in claim 6, wherein said reversing means comprises a four-way valve.

9. Apparatus of the character defined in claim 8, wherein the one-way valve means includes means to prevent flow from the flowline to the accumulator.

10. Apparatus of the character defined in claim 5, wherein said reversing means comprises a four-way valve.

11. Apparatus of the character defined in claim 10, wherein the one-way valve means includes means to prevent flow from the flowline to the accumulator.

12. Apparatus of the character defined in claim 5, wherein the one-way valve means includes means to prevent flow from the flowline to the accumulator.

13. Apparatus for opening and closing a pipeline valve, comprising an actuator for moving the closure member of said valve, an accumulator, means including a four-way valve connecting a point on the upstream side of said valve to said actuator and said actuator to said accumulator for selectively admitting pressure fluid from said point to said actuator and exhausting pressure fluid from said actuator to the accumulator for temporarily storing same, whereby said valve may be urged toward opened or closed position, and means including a one-way valve connecting said accumulator with a point of the downstream side of said valve for exhausting said accumulator when the pressure at said downstream point falls below the accumulator pressure.